United States Patent [19]

Skalski

[11] Patent Number: 5,373,123
[45] Date of Patent: Dec. 13, 1994

[54] ELECTROMAGNETIC GAGING OF ELEVATOR RAILS AND OTHER STRUCTURES

[75] Inventor: Clement A. Skalski, Avon, Conn.

[73] Assignee: Otis Elevator Company, Farmington, Conn.

[21] Appl. No.: 142,654

[22] Filed: Oct. 25, 1993

Related U.S. Application Data

[63] Continuation-in-part of Ser. No. 994,237, Dec. 21, 1992, abandoned.

[51] Int. Cl.[5] .............................................. B66B 3/02
[52] U.S. Cl. .................................. 187/393; 73/786; 324/207.18; 187/391
[58] Field of Search ............... 187/133, 134, 115, 95, 187/107, 100; 73/786; 324/207.18, 207.11

[56] References Cited

U.S. PATENT DOCUMENTS

| | | | |
|---|---|---|---|
| 4,088,952 | 5/1978 | Sikora | 324/207 |
| 4,754,849 | 7/1988 | Ando | 187/95 |
| 4,967,154 | 10/1990 | Marantette | 324/207.12 |
| 5,065,093 | 11/1991 | Nauta et al. | 324/207.12 |
| 5,065,631 | 11/1991 | Ashpitel et al. | 73/849 |
| 5,086,882 | 2/1992 | Sugahara et al. | 187/95 |
| 5,151,562 | 9/1992 | Fujita et al. | 187/134 |
| 5,193,651 | 3/1993 | Shigeta et al. | 187/95 |
| 5,214,947 | 6/1993 | Sissala et al. | 72/17 |

*Primary Examiner*—Steven L. Stephan
*Assistant Examiner*—Robert Nappi

[57] ABSTRACT

Orthogonal sets (26, 28) of coils (21-24) are each connected for differential response to an alternating magnetic field in a taut wire (20) disposed adjacent a rail (76) in an elevator hoistway. The wire is powered with AC current (34, 38) which is also used (40, 44) to synchronously demodulate the response of the coils to the alternating magnetic field so as to produce an output signal (58, 67) indicative of the position of the coils with respect to the taut wire. The coils may be in a holder (70) which is resiliently urged (72) toward the rail, with the wire passing through a hole therein within the coils, or mounted on an elevator which also has a contactless rail position sensor (110-112). Variation in current adjacent the coils is measured by additively coupling the coils (FIGS. 8, 9) which may be used to compensate the position measured by the coils (FIG. 11). Rectangular coil cross sections, as well as preferred coil spacing and dimensions are shown.

11 Claims, 5 Drawing Sheets

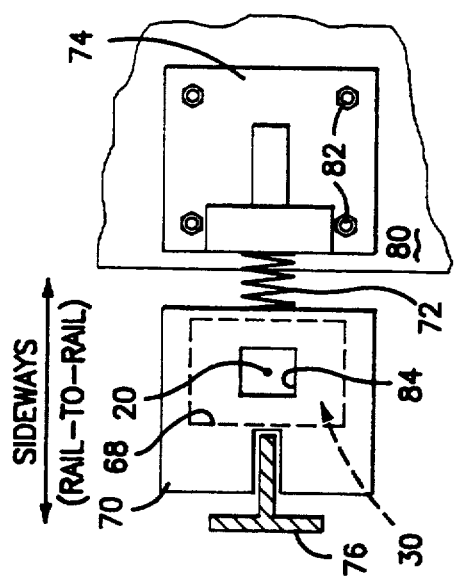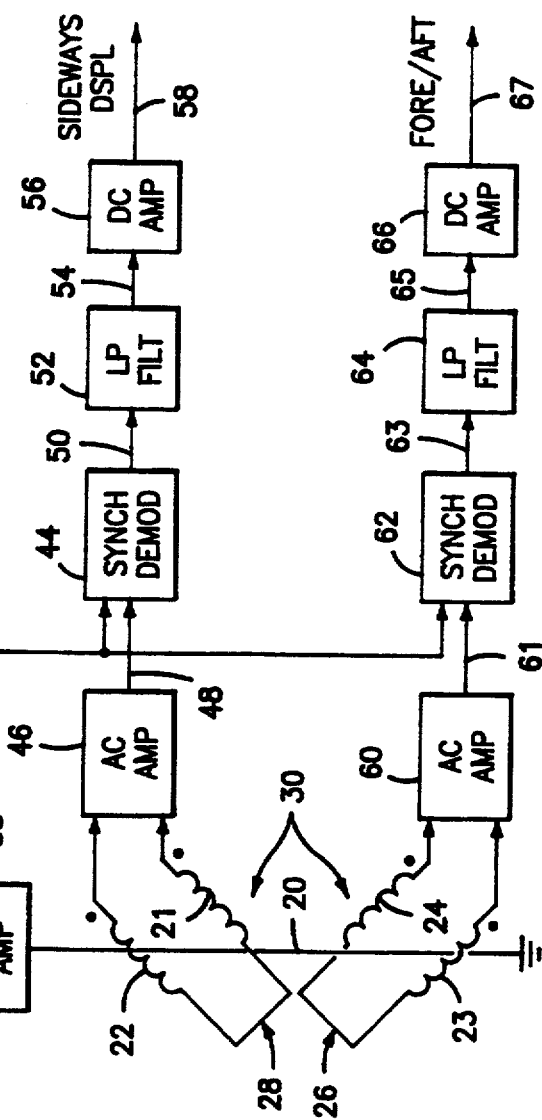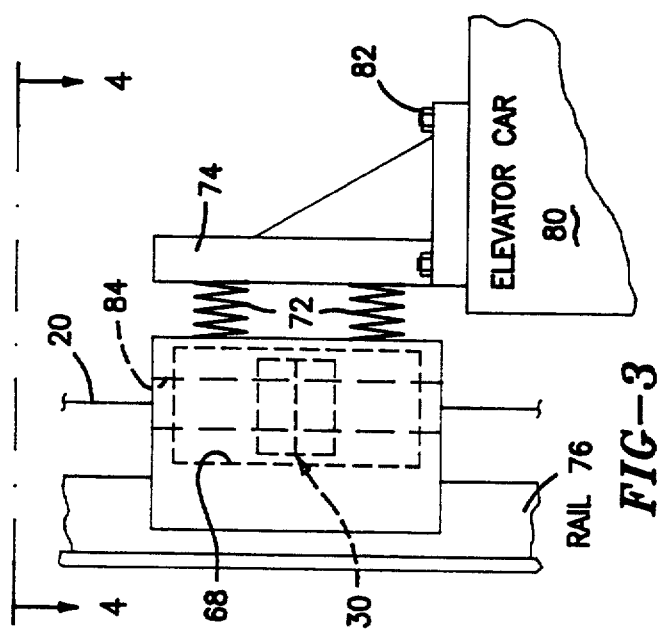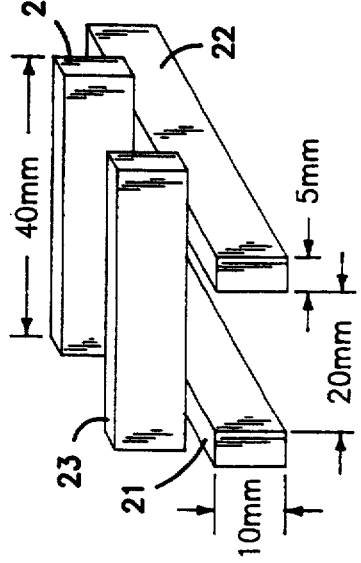

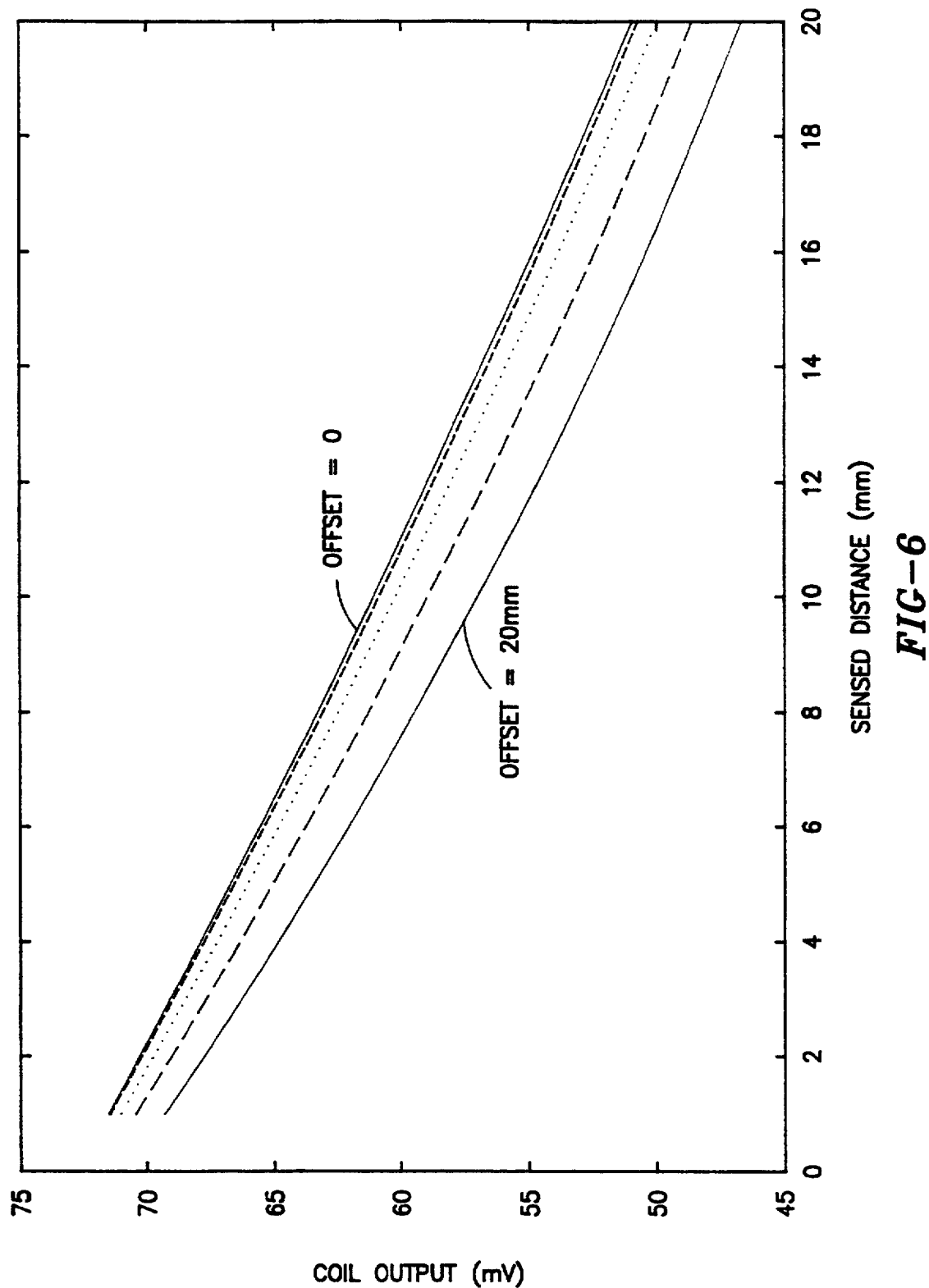

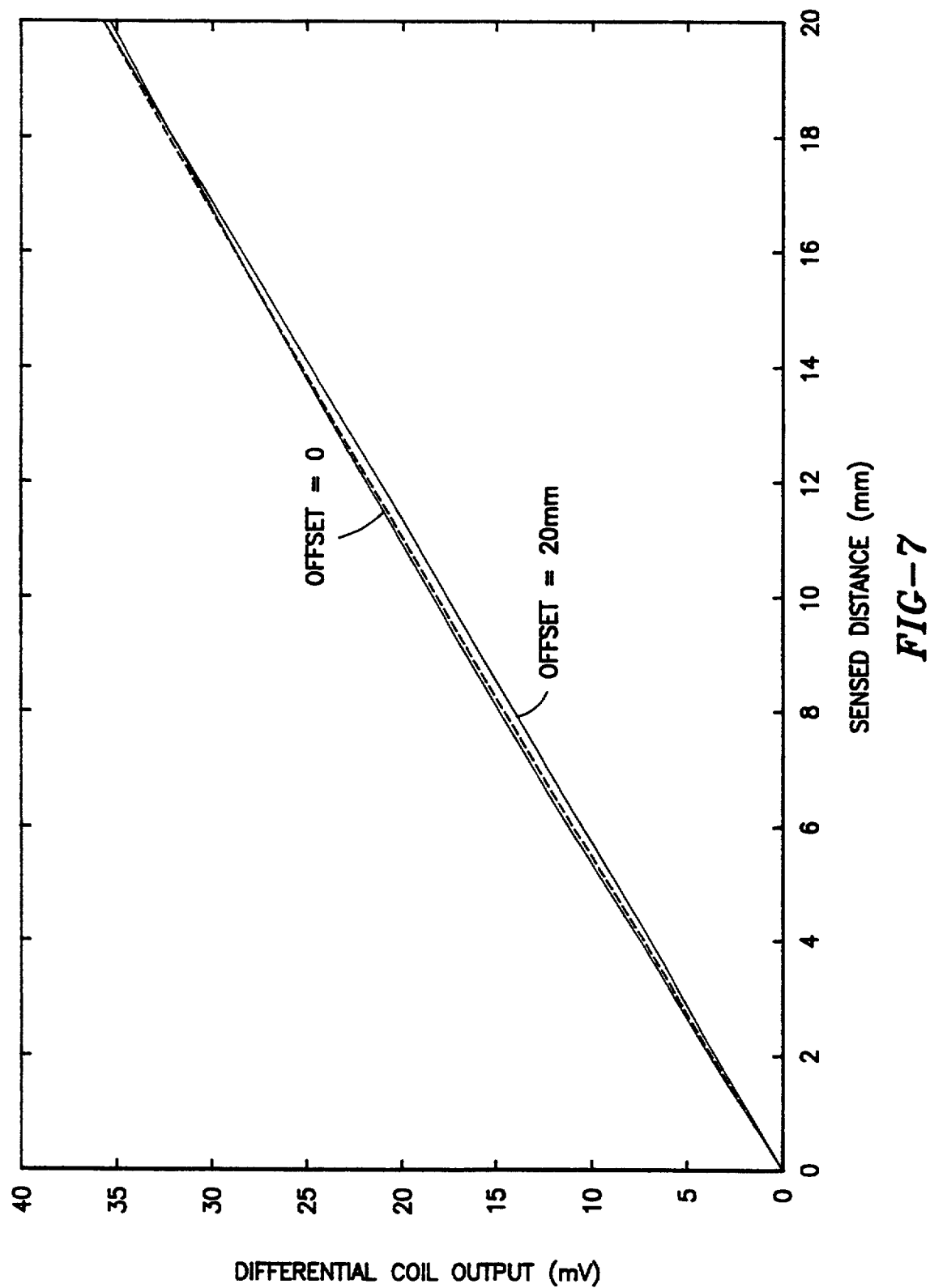

ELECTROMAGNETIC GAGING OF ELEVATOR RAILS AND OTHER STRUCTURES
===

This is a continuation-in-part of application Ser. No. 07/994,237, filed Dec. 21, 1992, now abandoned.

TECHNICAL FIELD
---

This invention relates to gaging distance with respect to structures such as elevator rails by magnetic sensing of the position of a taut wire carrying an AC current.

BACKGROUND ART
---

As is well known, elevator cars suspended in a hoistway are guided by rails which are typically positioned to guide the sides of the elevator car.

The installation of rails in a perfectly straight and parallel fashion is a difficult task. Additionally, settlement and other adjustments in building dimensions cause rails to require periodic straightening so as to ensure smooth, parallel tracks upon which the elevator can ride smoothly. In order to measure the position of the rails along an entire hoistway, it is known to use a taut wire extending vertically near the rail, and measuring the distance between the wire and the rail in both the side-to-side (rail-to-rail) and front-to-back directions. This requires gaging the distance at a large number of points and is extremely time-consuming. It is also known to measure the distance between the rail and an elevator or a cross-rail gage or spacing bar. Such a measurement can be achieved with gages, or with electromechanical position sensors, such as linear variable differential transformers (LVDTs), hall effect devices and the like. Elevator rail gages (such as LVDTs) which contact a taut wire have the disadvantage of inducing oscillations in the wire, which prevents use of such gages other than at extremely low speeds, while standing still, or with rest periods between movement and the recording of measurements.

A more recent approach to handling the rail alignment problem in elevators includes active compensation, which positions the elevator car different distances from the rail so as to keep the elevator car more nearly within a single pair of vertical planes as it travels vertically in the hoistway, In this approach, a map of rail positions is made, as a function of the vertical position in the hoistway, and this map is used to force the elevator car to be the correct distance from the rail with electromechanical actuators. Providing the map of rail positions can be achieved in any of the known ways referred to hereinbefore, but is currently being achieved by means of acceleration measurements taken with accelerometers while the elevator car is moving within the hoistway. As is known, acceleration can be doubly integrated to provide position, which in turn can create the map of compensation to be utilized. An example is shown in a commonly owned, co-pending U.S. patent application entitled "Measurement of the Horizontal Deviations of an Elevator Car Vertical Hoistway Rail" Ser. No 07/668,544 filed on Mar. 13, 1991 by Roberts. However, determining position with accelerometers has the disadvantages of a time lag, which requires correlating the data to proper position, and of false readings due to forces within the elevator car other than those imposed by the rails. An elevator active compensation system which purports to work directly from instantaneously sensed deviations from a taut wire (plumb line) uses gap sensors to determine the relative position of the elevator car with respect to the taut wire, is shown in Ando U.S. Pat. No. 4,754,849. However, the measuring of distance by means of a gap sensor is tenuous at best, and with respect to a taut wire, is very difficult. The issues of sensitivity, linearity and cross coupling are not addressed in the Ando patent. A detector using taut wires having optical wire sensors on either ends of a spacing bar is shown in Japanese Patent 232680, Oct. 16, 1991. In Sikora Patent 4,088,952, a system for providing a visual indication of the deviation of a wire from a nominal position employs a pair of coils, on opposite sides of the wire, which respond to AC current in the wire. Since this is a nulling system, it is not concerned with linearity; since only one axis is involved, it does not deal with cross-axis coupling at all.

Another innovation has been the use of lasers to align rails. However, these are limited to use in buildings having only a few tens of floors, and are complex and expensive.

DISCLOSURE OF INVENTION
---

Objects of the invention include provision of gaging of structures, such as an elevator hoistway rail, which can be performed during relative motion between the structure and the gage which is of relatively low cost, which may be used on elevator rails in buildings having many tens of floors, including on the order of 100 floors or more, which is readily implemented in a reliable way, and which is sufficiently rugged to be capable of working reliably in adverse environments. More specific objects include provision of a taut wire position sensor which has little or no inherent error, which is highly linear, which is accurate, and which is capable of reading position in each of two orthogonal directions simultaneously with very low cross-axis coupling.

According to the present invention, a taut wire sensor for distance gaging employs an alternating current in a taut wire adjacent a structure and utilizes the difference of voltage induced in a pair of substantially rectangular coils on opposite sides of the wire to provide a very accurate, very linear indication of the position of the structure with respect to the wire as a consequence of the position of the coils about the wire. In accordance further with the invention, a pair of orthogonally disposed, substantially rectangular coil pairs are used to accurately and linearly sense, with very little cross-axis coupling, both sideways and fore-and-aft (orthogonal) positioning with respect to the taut wire. The coils may be shielded.

In further accord with the invention, sensing of two orthogonal directions with minimum cross coupling, good scale factor, and dynamic range is achieved utilizing two, orthogonally disposed pairs of coils, each pair of coils being separated by about one-half the coil length. In still further accord with the invention, the rectangular cross section of the coils may have a dimension normal to the taut wire which is on the order of a quarter of the distance between two coils of a pair; said dimension is preferably less than, and may be half of, the other dimension of the rectangular cross section.

According further to the invention, the AC current in a taut wire is measured by the summation of voltage induced in a coil pair which provides an output that is relatively insensitive to the position of the coils with respect to the taut wire, and therefore may be utilized to normalize the differential coil pair output for variation in AC current within the taut wire, as a consequence of losses, (such as in very tall elevator hoistways-many tens of floors, or over 100 floors). In accordance further with the invention, the differential and summation responses can be achieved simultaneously.

According to the invention still further, the contactless sensing of the relative position of a taut wire utilizing coils responsive to an AC current in the wire, described hereinbefore, may be combined with non-contact position sensors so as to provide a totally contactless gage employing the invention.

The invention is easily implemented with phase discrimination apparatus which is readily available in the art. The differential coil pairs have predictable, small cross axis coupling which permits sensing in orthogonal directions simultaneously. Because the sensor is non-contacting, there is no restriction on motion when in use. Since the taut wire sensor of the invention does not use optical or laser devices, it is capable of working in very adverse environments and in buildings of unlimited height. The invention may be used for initial elevator rail alignment, for rail straightening, and for dynamic rail compensation, as desired. The invention may be utilized on rail alignment spacing bars, or directly on elevator cars.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a simplified block diagram of a simple elevator hoistway rail sensor according to the invention;

FIG. 3 is a simplified side elevation view of a taut wire and rail in a hoistway and a sensor of the invention attached to an elevator car;

FIG. 4 is a section taken on the line 4—4 of FIG. 3;

FIG. 5 is a simplified perspective illustration of two coil pairs;

FIG. 6 is a graph illustrating response of a coil and cross coupling effects as a function of position of the wire;

FIG. 7 is a graph illustrating sensitivity and cross coupling of a rectangular differential coil pair in accordance with the invention;

BEST MODE FOR CARRYING OUT THE INVENTION

Figure 8:
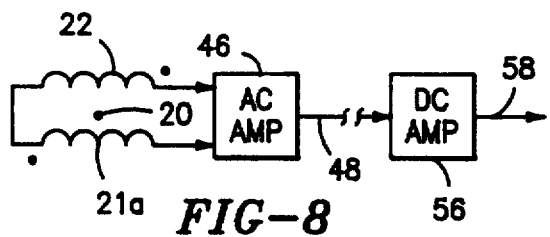
FIGS. 8 and 9 are simplified schematic illustrations of coil pairs connected in summation.

Referring now to FIG. 1, a taut wire 20 extends vertically throughout the hoistway of an elevator. A plurality of coils 21-24 are connected to form a first differential pair in a fore and aft sensor 26 and a second differential pair in a sideways sensor 28, which together comprise an orthogonal magnetic elevator rail gage 30 in accordance with the invention. Each of the coils 21-24 may be on the order of 4-8 cm long and have on the order of 300-1,000 turns, formed on a bobbin with a substantially rectangular cross section on the order of 5 to 10 millimeters by 10 to 20 millimeters The coils 21-24 may each be separated from the other coil in the pair by about one-half the coil length, such as on the order of 20-40 millimeters. The height of the coil is believed to be less critical than the width, and may be scalable upward for increased sensitivity. However, a rectangular cross section with height about twice the width, as shown in FIG. 5, is believed to provide the best linearity.

A carrier oscillator 32 provides a signal of 1 kHz-10 kHz, such as on the order of 2.5 kHz, on a line 36 to a power amplifier 38, which in turn provides about 1 amp at the carrier frequency to the taut wire 20. This provides alternating magnetic fields in the vicinity of the coil pairs 26, 28.

The carrier signal on the line 36 is also provided to a phase shifter 40 which permits varying the phase for maximum sensitivity, to provide a signal on a line 42 to a synchronous demodulator 44. The differential coil pair 28 is connected through a differential AC amplifier 46 to the synchronous demodulator 44 by a line 48. The output of the synchronous demodulator 44 on a line 50 is filtered in a low pass filter 52 to provide a signal on a line 54 to a DC amplifier 56, the output of which on a line 58 comprises a voltage which is indicative of the sideways displacement of the coils from the wire. All of the apparatus 34-58 is available as LVDT instrumentation, such as the Schaevetz ATA-101 LVDT instrumentation, or the analog devices AD598 LVDT signal conditioning subsystem. The apparatus 34-58 may be combined with apparatus 60-67 which functions the same as the apparatus 44-58, in order to handle both sensors 26, 28. Or, separate sets 34-58 may be provided for each sensor.

The coils are wound in the same sense so that the AC voltages induced at the amplifier ends thereof are instantaneously of the same polarity, so that when summed in a differencing AC amplifier 46, the effect is the difference of the induced AC voltages. When the taut wire is centered, the amplifier inputs are equal and opposite and null each other out; when the wire is not centered, one input is at a higher voltage than the other, giving a resultant AC output proportional to the wire position. Use of a differencing amplifier 46 is preferred because of the well-known common mode rejection effects, which wouldn't be available in a summing amplifier.

Figure 2:
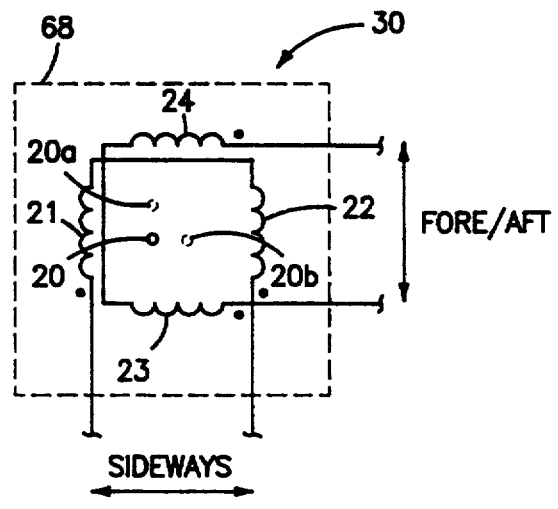
FIG. 2 is a detailed schematic of an orthogonal pair of differential coil sets for use in the apparatus of FIG. 1.

As seen in FIGS. 2 and 5, the axis of each coil 21-24 is a straight line in a plane normal to the wire 20. The axis of each coil 21-24 is also not within any plane of the wire 20; that is, the axis of each coil 21-24 is tangential to a circle normal to the wire 20 and having its center at a point midway between it and the related coil.

As shown in FIG. 2, the taut wire 20 may be disposed in the center between both axes of sensors 26, 28; or the wire (20a) may be disposed more closely to the aft sensor 24 as a result of the orthogonal sensor assembly 30 moving forwardly; or the wire (20b) may be closer to the right coil 22 as a consequence of the orthogonal sensor 30 moving toward the left. Because of this, it is necessary that the sideways motion, for instance, be sensed just as readily if oscillating about the position closer to the coil 24 (shown for the wire 20a) as when centered or closer to the coil 23; similarly, it is necessary that the fore and aft position be sensible either in a position of the wire midway between the coils 21, 22 (as shown by the wire 20 and 20a) as well as oscillating about the left position (shown by the wire 20b) which is closer to the coil 22. This is referred to herein as having low cross-axis coupling, meaning that the position of the wire with respect to one axis does not unduly affect the sensing of its position with respect to the other axis, and/or that the cross-axis coupling be predictable and therefore correctable. This is achieved by the coil configuration of the present invention.

Referring now to FIGS. 3 and 4, the orthogonal sensor 30 is shown disposed within a holder 70 which is urged by springs 72, fastened to a mount 74, toward the elevator hoistway rail 76. The holder 74 may be disposed directly on an elevator car 80, such as by bolts 82, or it may be disposed on a gauge or spacer bar or otherwise, to suit any use of the present invention which may be desired. The holder 70 has a hole 84 therethrough adjacent to which the coils 21-24 are disposed, and through which the wire 20 can pass without touching, even though the holder 70 may be moving to the right or left or fore and aft about the wire 20 as a consequence of the positioning of the rail 76. The holder 70 may be configured in other ways in order to suit any use of the invention.

The rail gage 30 may be protected from spurious magnetic influences by a conductive shield 68 (FIGS. 2-4) which surrounds the coils 21-24 and is displaced 5 to 50 mm outwardly thereof. It may be of a magnetic material, but it need not be.

FIG. 6 illustrates the response in a single one of the coils 21-24, for various distances of the coil with respect to the wire, which might be the coil 21 and the distances extending from the wire being close (0 mm) to the coil 21 (to the left in FIG. 2) outwardly to the wire being at the right edge (20 mm, as at 20b in FIG. 2). The output of the other coil, which might be the coil 22, would be high when the wire is to the left (20b) and low when the wire is to the right. It is this voltage output characteristic which can be utilized when in the differential mode to provide a differential coil pair response of the type illustrated in FIG. 7.

The response of one axis 26 or 28 of the invention to variations in relative position between the coils 21-24 thereof and the wire 20 bearing the AC current is illustrated in the graph of FIG. 7. Therein, it can be seen that the variation in the on-axis response varies only a small amount from the response in that axis when the wire is also disposed off axis, away from center in the other direction. It has been determined that the closer the coils 21-24 are to the wire 20, the greater the cross-axis coupling. In any given device, however, the cross-axis coupling is quite repeatable, and if it exceeds limits which are acceptable to any particular use of the data, it can be corrected for, mathematically, by causing each reading to be a decoded as a function of both readings, such as in a table lookup; or, each axis can have a small increment added thereto as a function of the reading in the other axis so as to achieve a coarse correction in a stepwise fashion. The data of FIG. 7 were derived in response to 1 amp at 2.5 KHz, from a sensor having 80 mm long coils of 800 turns each, each coil of a pair separated from the other coil of the pair by 42 mm, each coil having a rectangular cross section of about 10 mm wide by 20 mm high; however, it is believed that a sensor having dimensions about half of those would be superior, as in FIG. 5.

Figure 9:
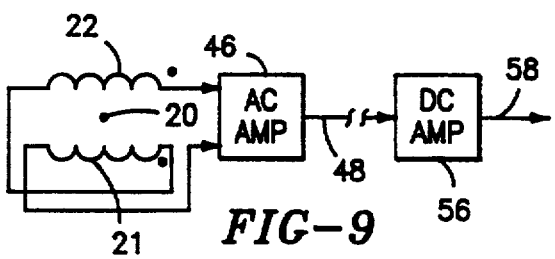
Figure 10:
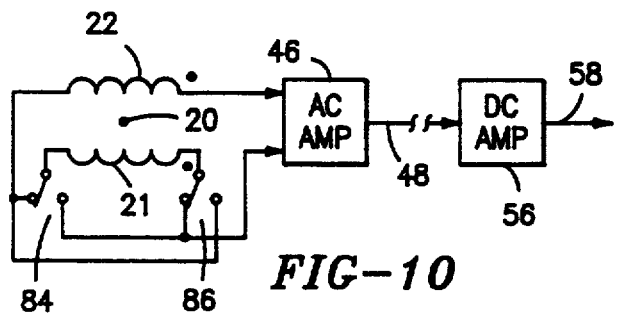
FIG. 10 is a simplified schematic illustration of switching of a coil pair between differential and summation connections.

Reference to FIGS. 6 and 7 illustrate that when the coils are connected in opposition alike and disposed on opposite sides of the taut wire 20, as is illustrated in FIGS. 1 and 2, they provide voltages of the same polarity to the AC differential amplifier 46. If, on the other hand, the coils were connected additively and disposed on opposite sides of the wire 20, as is illustrated by the dot notation of FIG. 8, the coils would present voltages of opposite sense to the summation provided by the AC differential amplifier 46. In such a case, addition of these opposite voltages result in output of the DC amplifier 56 in FIG. 8 which is essentially constant regardless of the position of the wire 20 between the two coils 21a and 22 in one axis so long as it is centered in the other axis. Once the coils are fabricated and in place, and the characteristics of the electronics are fixed, the only thing that will cause a variation in the output of the DC amplifier 56 in FIG. 8 is the magnitude of current in the wire 20. Therefore, the circuit of FIG. 8 (including the other circuitry of FIG. 1 associated therewith) provides at the output 58 a measure of the current in the wire 20. It should also be clear that the circuit of FIG. 9 illustrates a full equivalent of the circuit of FIG. 8. That is, having the coils 21, 22 wound the same way, but connecting the coils 21 backward from its connection in FIG. 1 achieves the same result as having them wound oppositely as in FIG. 8. It then becomes apparent that the coils can be switched between a differential mode (FIGS. 1 and 2) and a summation mode (FIGS. 8 and 9) by means of the switching circuitry of FIG. 10. Therein, the coil 21 is connected between a pair of switches 84, 86 and either the distal end of the coil 22 or the amplifier 46. As shown, through the normally closed contacts of the switches 84, 86 the arrangement is the same as FIGS. 1 and 2. However, if the armatures of the switches 84, 86 were transferred to the normally open contacts, then the configuration would be the same as FIG. 9.

Operation of the coils in summation, which is sensitive only to current, can normalize the displacement measurement provided by the apparatus of FIG. 1 for variations in current, particularly current loss in cases where the taut wire 20 is extremely long (in excess of tens of floors). The current losses occur because of stray capacitance and inductance effects which create leakage paths so that the current near the source is higher than the current remaining in the taut wire at the extreme far ends thereof. This would cause lower output readings than would be the case if the current were constant, and therefore, if uncompensated, introduces error into the system. It is possible to use the simpler embodiments of FIGS. 1 through 5 by providing some form of static compensation for current loss in each given elevator shaft hoistway. But provision of dynamic compensation or current variations will provide a far more accurate and useful displacement measuring system for very long elevator rails.

Total compensation can be achieved simply by dividing the displacement as a function of the difference between voltages in the coils 21, 22 and in the coils 23, 24, all as described with respect to FIGS. 1 hereinbefore, with the current indicated in response to the summation of the voltage generated in the coils 21, 22 and in the coils 23, 24. However, switching the coils back and forth into the same amplifier 46, and alternating the use of the circuits to develop position and then current, could be very tricky, time wise.

Figure 11:
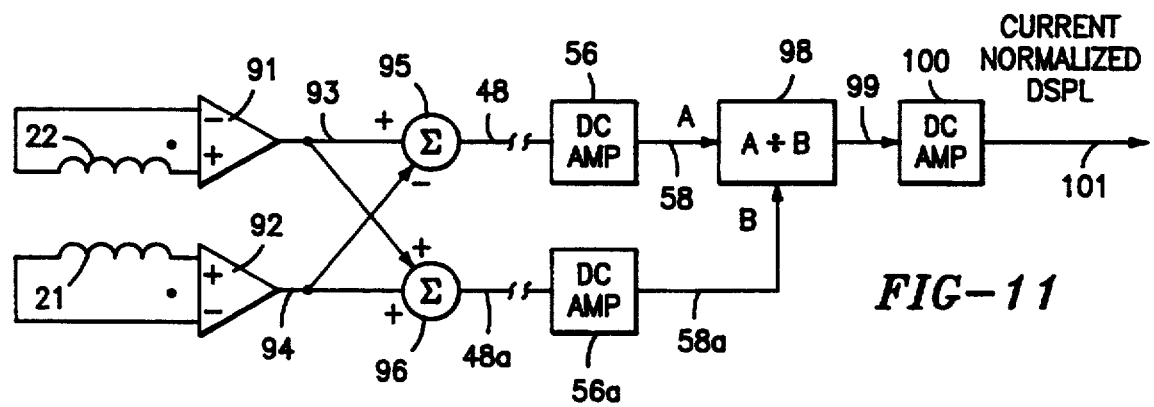
FIG. 11 is a simplified, schematic block diagram of an elevator hoistway rail sensor utilizing coil switching to achieve current compensation.

A simplified analog embodiment of a sensor having current correction is illustrated in FIG. 11. Therein, the normally open and normally closed contacts of the switches 84, 86 are eliminated by simultaneously producing the sum and the difference of a pair of coils that are polled to produce in-phase voltages, as seen in FIG. 11. Therein, each of the coils 21, 22 is applied in the same sense to differencing amplifiers 91, 92, the outputs of which on lines 93, 94 are subtracted and added in corresponding summing amplifiers 95, 96, respectively. This provides signals on lines 48 and 48a which are equivalent to the signal on line 48 (FIG. 10) with the switches 84, 86 in a normally closed position, and with the switches 84, 86 in a normally open position, respectively. Then each signal is synchronously demodulated and filtered as in FIG. 1 and passed through a corresponding DC amplifier 56, 56a so as to produce on related lines 58, 58a signals indicative of displacement and of the level of current in the wire 20, respectively. The displacement signal on the line 58 is then applied to the dividend input (A) of a divide circuit 98, while the current signal on the line 58a is applied to the divisor input (B) of the divide circuit to produce the signal on a line 99 which is equivalent to the quotient of the two signals, and is indicative of displacement normalized for variations in current. This result can be amplified further in a DC amplifier 100 so as to provide a suitable signal on a line 101. The apparatus just described in FIG. 11 relates only to a single sensor 28 of FIG. 1; similar equipment connected to coils 23, 24 would provide displacement normalized for current in the opposite axis.

The overly simplified example of FIG. 11 is analog in nature, and doesn't take into account the fact that there is error in the current measurement as well as the displacement measurement, as a function of offsets, as is shown in the graphs of FIGS. 6 and 7. As described briefly hereinbefore with respect to the simple embodiment of FIG. 1, it may be preferred to digitize, in turn, the signals provided on the lines 58 and 58a in FIG. 11, and on equivalent lines of the other axis of a displacement sensor with current compensation. Then, the digital signals may be digitally processed to take into account, in each axis, the offset (the position in the other axis) so as to normalize both the displacement and the current for offsets before making the final division for current compensation. The formulation of digital signal processing in accordance with the teachings hereinbefore are very straightforward and capable of being achieved utilizing a wide variety of available hardware and software capabilities and techniques which are well known in the art, in the light of the teachings herein.

The additively coupled coil (FIGS. 8 and 9) aspect of the present invention, which is insensitive in one axis to wire position and therefore sensitive mainly to current and partially to offset, may also be used as a measurement instrument to measure the variation in current along the length of a taut wire, for purposes related to the present invention (that is, measurement of elevator rail displacement) or for other purposes, even those having nothing to do with an elevator.

Figure 12:
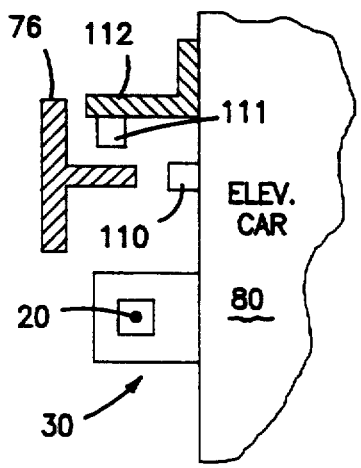
FIG. 12 is an illustration of a non-contacting rail gage employing the present invention.

The embodiments described hereinbefore use a non-contacting sensor to sense the position of the elevator rail 76 with respect to the taut wire 20. The sensor is non-contacting, with respect to the wire; however, in order to assure that the sensor follows the rail, the embodiment of FIGS. 3 and 4 hereinbefore has the sensor contacting the rail. Because it is much easier to provide non-contact sensing to a rail than it is to a wire, the present invention can be utilized to provide a totally non-contacting rail gage in the manner illustrated in FIG. 12. Therein, the taut wire 20 is disposed at a position which is offset from the rail 76. The rail gage 30 is mounted, surrounding the taut wire, directly to the elevator car 80. Additionally, some form of non-contacting sensor elements 110, suitable brackets 112 and associated circuitry (not shown) can be used to determine the relative position of the elevator car with respect to the rail, which can in turn be translated with the rail gage 30 to the known position of the wire. This typically is done by subtracting the sidewise output of the rail gage 30 from the distance measured by the element 110, and subtracting the fore/aft output of the rail gage 30 from the distance determined by the element 111. In the embodiment of FIG. 12, any of the foregoing embodiments may be utilized for the rail gage 30. The sensing elements 110, 111 may be capacitive sensors, or may be any other known form of non-contacting distance sensing devices. With some adaptation, the sensing elements 110, 111 may take the form of a electromagnetic capacitor transducer of the type illustrated in Skalski, "Capacitance Distance Transducer", *Proceedings of the IEEE*, Vol 56, No 1, January, 1968, pp. 111–112.

Of course, many changes and variations can be made within the invention. The separately amplified coil outputs using amplifiers 91, 92 and the summing junction 96 could be used in place of the AC amplifier 46 in FIG. 1 even if the displacement signal is not being normalized for current, since these are obviously fully equivalent. The synchronous demodulators 44, 62, etc. are phase sensitive detectors; if desired, non-synchronous rectifiers could be used as detectors, if desired; however, such detectors would have to be of a high precision variety, and the use thereof is not preferred. Use of AD630 synchronous detectors is recommended. The invention may be used for gaging to a taut wire in other than elevator embodiments. One of the most significant features of the present invention is that it provides for electromagnetic sensing utilizing rectangular coil arrays so as to be able to provide totally distinct, highly linear orthogonal outputs with extremely low cross-axis coupling, such as the sideways and fore/aft outputs of FIGS. 1 and 2 herein. Of course, the coil cores need not be totally and completely straight, so long as any deviation is relatively small and retains the orthogonal sensitivity characteristics of the embodiments herein.

Figure 13:
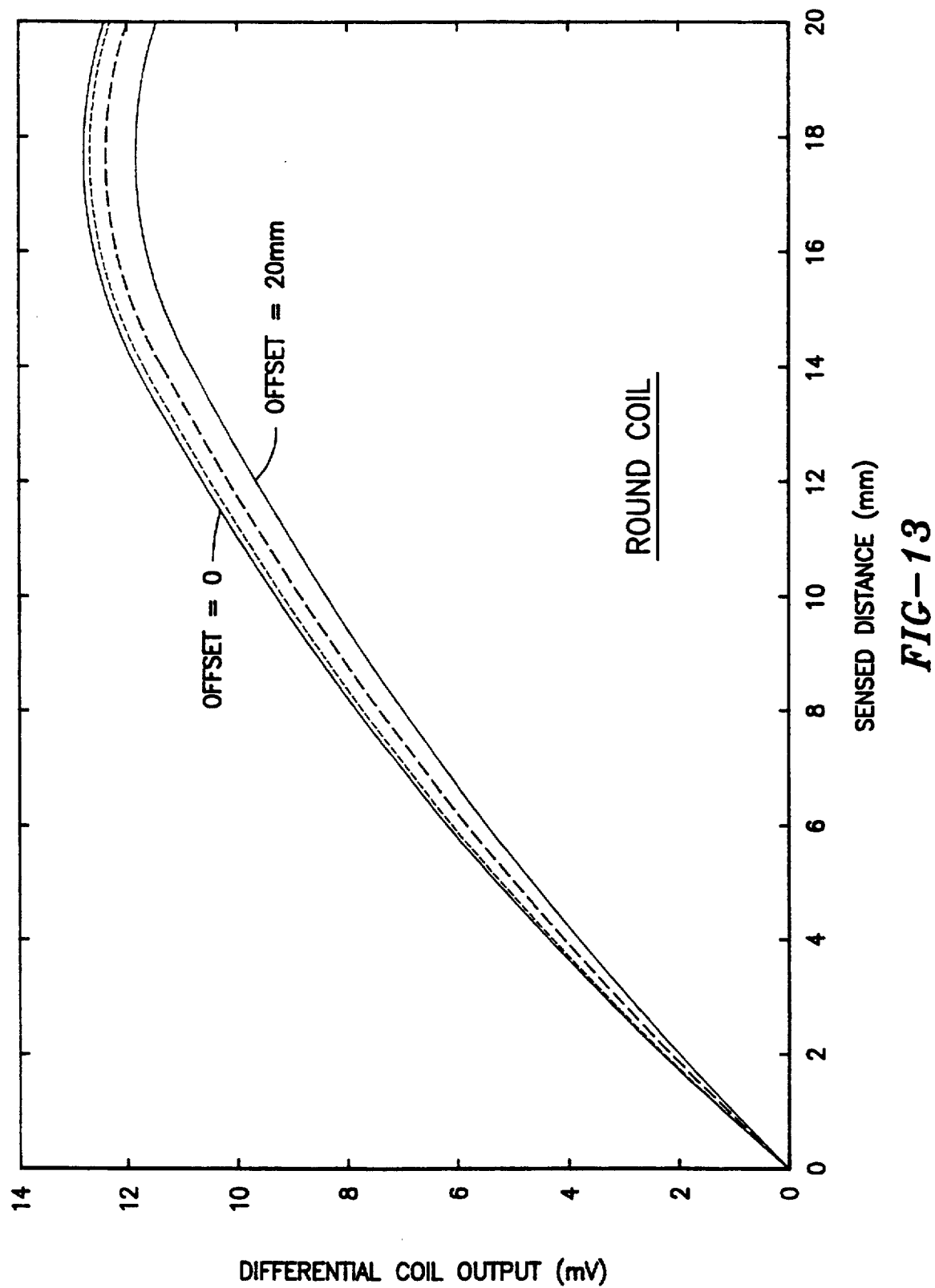
FIG. 13 is a graph illustrating sensitivity and cross-coupling of a round differential coil pair, for comparison with the invention of FIG. 7.

The invention is principally dependent on use of sensor cores of a rectangular configuration, which provides highly linear results with little deviation as a result of cross-axis offsets, as shown in FIG. 7. By comparison, a sensor which is essentially identical (to that used in FIG. 7) but for having coils of round cross section provided the non-linear output, with as much as 10% cross-axis error, shown in FIG. 13. It is also believed that the sensitivity of the device, as well as its linearity and insensitivity to cross-axis coupling, are enhanced by having a correct aspect ratio, that is, the width of the coil versus the spacing between the coils. That is to say, the dimension of the coil radially from the wire (transverse; 5 mm in FIG. 5) being about one-fourth the distance between the two coils (20 mm in FIG. 5) gives better results than having smaller aspect ratios or aspect ratios which are much larger. This is believed to be due to the fact that the response of the coil to the AC field induced by current in the wire becomes very small when the coil is very narrow (right to left in FIG. 5) but its differential response to the field as the wire moves toward and away from the coil becomes very low when the coil is extremely thick (right to left in FIG. 5). On the other hand, the height of the coil (parallel to the taut wire when the sensor is mounted) seems to have little effect on the differential response of the coil to the field induced by the wire, whereas an increased height to the coil does increase the response of the coil generally to the field induced by the current in the wire. This perhaps also explains why the rectangular core provides such significant improvement in results in comparison with a circular core.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A sensor for mounting on a structure to measure the relative displacement between the structure and a taut wire having alternating electric current flowing through it, comprising:
   a pair of electrical coils, each coil having a straight axis, said pair of coils having one end of each connected together so that an alternating magnetic field interposed midway between the pair will induce a voltage across each coil which is substantially equal to and of the same sense as the voltage in the other of said coils, said coils mountable on said structure so that each coil is on a side of the taut wire opposite the other of said coils centered about the nominal position of said taut wire;
   wherein the improvement comprises:
   said coils being mountable on said structure coplanar with each other and with the axis of each coil tangential to a circle centered between said coils and in a plane normal to said taut wire; and
   each coil having a substantially rectangular cross section.

2. A sensor according to claim 1 wherein said rectangular cross section has a dimension transverse to the taut wire when mounted on the structure which is about one-fourth the spacing between said coils.

3. A sensor according to claim 2 wherein said spacing is between about 20 millimeters and about 40 millimeters.

4. A sensor according to claim 1 wherein said rectangular cross section has a dimension transverse to the taut wire when mounted on the structure which is a significant fraction of the dimension parallel with the taut wire.

5. A sensor according to claim 4 wherein each coil has a cross section of about 5 millimeters to about 10 millimeters by about 10 millimeters to about 20 millimeters.

6. A sensor according to claim 1 wherein:
   said coils are of about the same length and are spaced from each other when mounted on said structure by a distance of about one-half their length.

7. A sensor according to claim 6 wherein each coil is about 40 millimeters to about 80 millimeters long and is separated from the other coil by about 20 millimeters to about 40 millimeters.

8. A sensor for mounting on a structure to measure the relative displacement between the structure and a taut wire having alternating electric current flowing through it, comprising:
   two pairs of electrical coils, each coil having a straight axis, one end of each coil in a pair connected together so that an alternating magnetic field interposed midway between the pair will induce a voltage across each coil which is substantially equal to and of the same sense as the voltage in the other of said coils, said coils mountable on said structure so that each coil in a pair is on a side of the taut wire opposite the other coil in said pair, centered about the nominal position of said taut wire;
   wherein the improvement comprises:
   said coils of each pair being mountable on said structure coplanar with each other, with the axes of the coils in each pair tangential to a circle centered between said coils and in a plane normal to said taut wire, and with the axes of the coils in each pair normal to the axes of the coils in the other of said pairs; and
   each coil having a rectangular cross section.

9. A sensor according to claim 8 wherein said rectangular cross section has a dimension transverse to the taut wire when mounted on the structure which is about one-fourth the spacing between said coils in a pair.

10. A sensor according to claim 8 wherein:
    the coils in each pair are of about the same length and are spaced from each other when mounted on said structure by a distance of about one-half their length.

11. A sensor according to claim 8 wherein each coil has a generally rectangular cross section of which a dimension transverse to the taut wire when mounted on the structure is a significant fraction of the dimension parallel with the taut wire.

* * * * *